United States Patent
Li

(10) Patent No.: US 11,016,564 B2
(45) Date of Patent: *May 25, 2021

(54) SYSTEM AND METHOD FOR PROVIDING INFORMATION

(71) Applicant: Chian Chiu Li, Fremont, CA (US)

(72) Inventor: Chian Chiu Li, Fremont, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/779,676

(22) Filed: Feb. 3, 2020

(65) Prior Publication Data

US 2020/0166998 A1 May 28, 2020

Related U.S. Application Data

(62) Division of application No. 15/917,625, filed on Mar. 10, 2018, now Pat. No. 10,768,697.

(51) Int. Cl.
| | | |
|---|---|---|
| *G06F 3/01* | (2006.01) | |
| *G06Q 30/02* | (2012.01) | |
| *G06F 1/3203* | (2019.01) | |
| *G06F 3/16* | (2006.01) | |
| *G06F 3/0481* | (2013.01) | |

(52) U.S. Cl.
CPC ............ *G06F 3/013* (2013.01); *G06F 1/3203* (2013.01); *G06F 3/012* (2013.01); *G06F 3/016* (2013.01); *G06F 3/017* (2013.01); *G06F 3/0481* (2013.01); *G06F 3/167* (2013.01); *G06Q 30/0241* (2013.01)

(58) Field of Classification Search
CPC .......... G06F 3/013; G06F 3/012; G06F 3/016; G06F 3/017; G06F 3/0481; G06F 3/167; G06F 1/3203; G06Q 30/0241
See application file for complete search history.

(56) References Cited

U.S. PATENT DOCUMENTS

| | | |
|---|---|---|
| 6,734,845 B1 | 5/2004 | Nielsen et al. |
| 7,091,471 B2 | 8/2006 | Wenstrand et al. |
| 8,957,847 B1 | 2/2015 | Karakotsios et al. |
| 9,880,618 B2 * | 1/2018 | Li ........................... G06F 3/013 |
| 10,025,380 B2 | 7/2018 | Hodge et al. |
| 10,216,266 B2 | 2/2019 | Krulce et al. |
| 2003/0038754 A1 | 2/2003 | Goldstein et al. |
| 2005/0071698 A1 | 3/2005 | Kangas |
| 2005/0199783 A1 | 9/2005 | Wenstrand et al. |
| 2007/0078552 A1 | 4/2007 | Rosenberg |
| 2010/0153764 A1 | 6/2010 | Pratt et al. |
| 2011/0302538 A1 | 12/2011 | Vennelakanti et al. |
| 2013/0135198 A1 | 5/2013 | Hodge et al. |
| 2013/0342672 A1 | 12/2013 | Gray et al. |
| 2014/0132508 A1 | 5/2014 | Hodge et al. |

* cited by examiner

*Primary Examiner* — Kenneth B Lee, Jr.

(57) ABSTRACT

Systems, methods and apparatus for presenting information using an electronic device. In an aspect, when a standby or idle device detects that a user gazes at it, it starts showing content items on a display. In other aspects, when a standby or idle device detects that a user shakes it, taps on it, or speaks to it, plus that the user gazes at it, the device begins to show content items on a display. The content items may include advertisements.

20 Claims, 6 Drawing Sheets

SYSTEM AND METHOD FOR PROVIDING INFORMATION

CROSS REFERENCE TO RELATED APPLICATION

Figure 1:
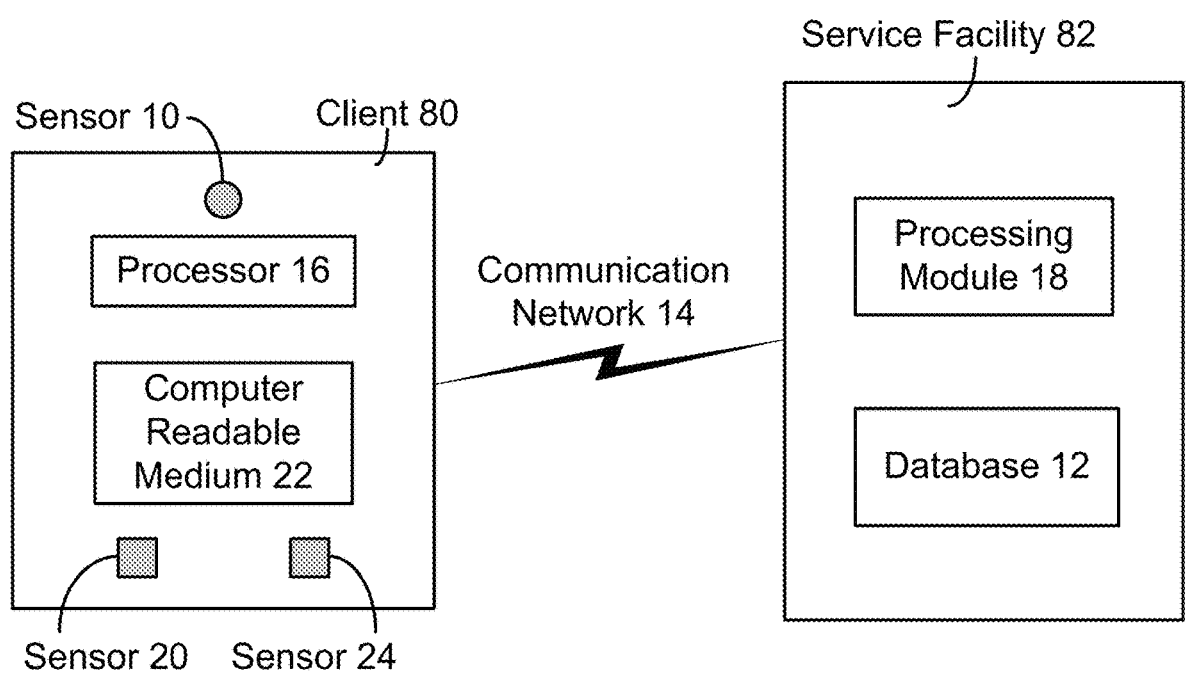

This is a division of U.S. application Ser. No. 15/917,625, filed Mar. 10, 2018, which is a continuation-in-part of U.S. application Ser. No. 15/802,427, filed Nov. 2, 2017, which is a continuation of U.S. application Ser. No. 15/494,464, filed Apr. 22, 2017, which is a division of U.S. application Ser. No. 14/217,486, filed Mar. 18, 2014, now U.S. Pat. No. 9,671,864, granted Jun. 6, 2017.

FEDERALLY SPONSORED RESEARCH

Not applicable

SEQUENCE LISTING OR PROGRAM

Not applicable

BACKGROUND

Field of Invention

This invention relates to providing information, more particularly to providing information using an electronic device and eye-tracking technologies.

Description of Prior Art

When a smartphone is standby, its display may turn dark to save energy. Without user intervention, the smartphone would stay that way. In some cases, a user may not want to play with a standby phone, because he or she may be busy doing other things. In some other cases when a user is not busy, he or she may still be reluctant to awake a phone from standby state, if there isn't anything interesting. In the latter scenario, a user may have time to take or view information, while a smartphone may have a blank screen ready to display and convey info. However, there lack convenient ways and incentives for a user to start it. As a consequence, the phone may continue to be idle, while a user may just gaze at a dark empty screen, causing a waste of time for both the user and phone.

Accordingly, there exists a need to utilize idle time of smart phone and other electronic devices to present information to idling users.

Advertisements represent a major revenue source for many internet service providers and internet companies. When users surf on the Internet or communicate with each other, however, most hold a rather negative attitude towards advertisements, which often tend to present contents in an intrusive, disruptive, obtrusive, or even rude manner. Intrusive ads include unexpected pop-up, unwelcome or oversized banners, or annoying flashing objects or pictures. On the other hand, advertisements made to be less intrusive often end up being ignored or less effective due to a weak or subtle appearance. In both cases, either users are offended, or ad effect is in doubt.

Thus, it is desirable to have a method and system which provide advertising information in a less-intrusive but effective way. Because an idle device sometimes means an idling user, it may be less intrusive and probably more effective to present advertisements utilizing an idle device in an unused time slot. But so far most internet advertisements appear at a rather awkward time, competing with programs a user is running or annoying a user who is already busy enough.

Therefore once again, there exists a need to utilize idle time of electronic devices like smartphones or tablet computers to present information. The idle time may be especially useful for showing advertising contents to idle users.

Objects and Advantages

Accordingly, several main objects and advantages of the present invention are:

a). to provide an improved method and system for presenting information;
    b). to provide such a method and system which target an idle or standby device;
    c). to provide such a method and system which monitor the gaze direction of a user to determine when to present information and when to stop a presentation; and
    d). to provide such a method and system which use a user input such as shaking, tapping, or voice command plus a gazing act to determine when to present information.

Further objects and advantages will become apparent from a consideration of the drawings and ensuing description.

SUMMARY

In accordance with the present invention, methods and systems are proposed to present information using an electronic device. More specifically, methods and systems are proposed to present information when a device is in idle or standby state. In one embodiment, when a user gazes at a blank screen of an idle device, indicating the user might not be engaged in anything, the device may take the opportunity to present news, updates, or other information. In another embodiment, when a user shakes, taps, or speaks to a standby or idling device, and then looks at it, the device may combine the shaking, tapping, or speaking act with the gazing act and consider the combination as a predetermined command to show scheduled information on a screen. Information presented may include advertisements.

DRAWING FIGURES

FIG. 1 is an exemplary block diagram describing one embodiment in accordance with the present invention.

Figure 2:
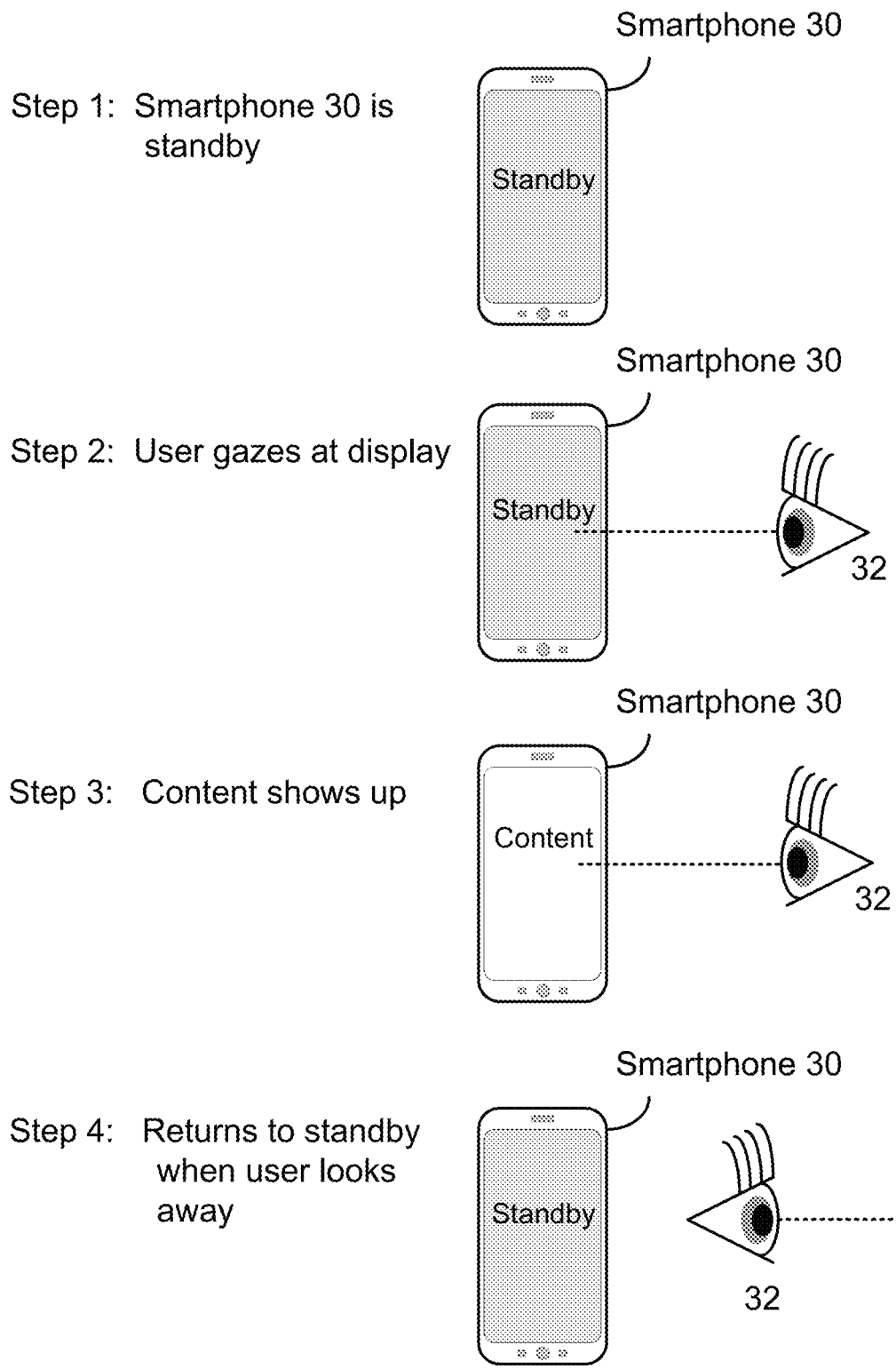

FIG. 2 displays exemplary diagrams showing one embodiment in accordance with the present invention.

Figure 3:
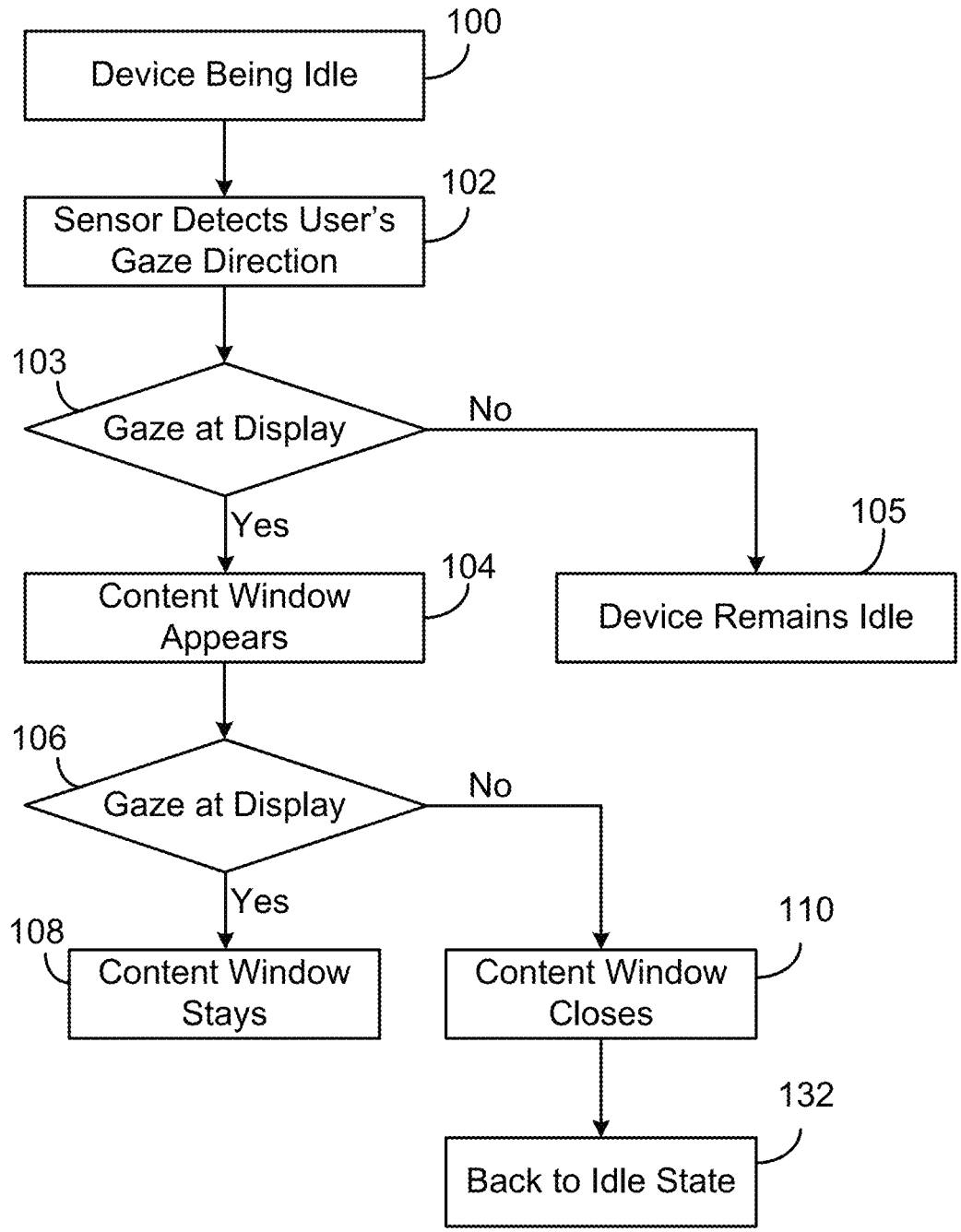
Figure 4:
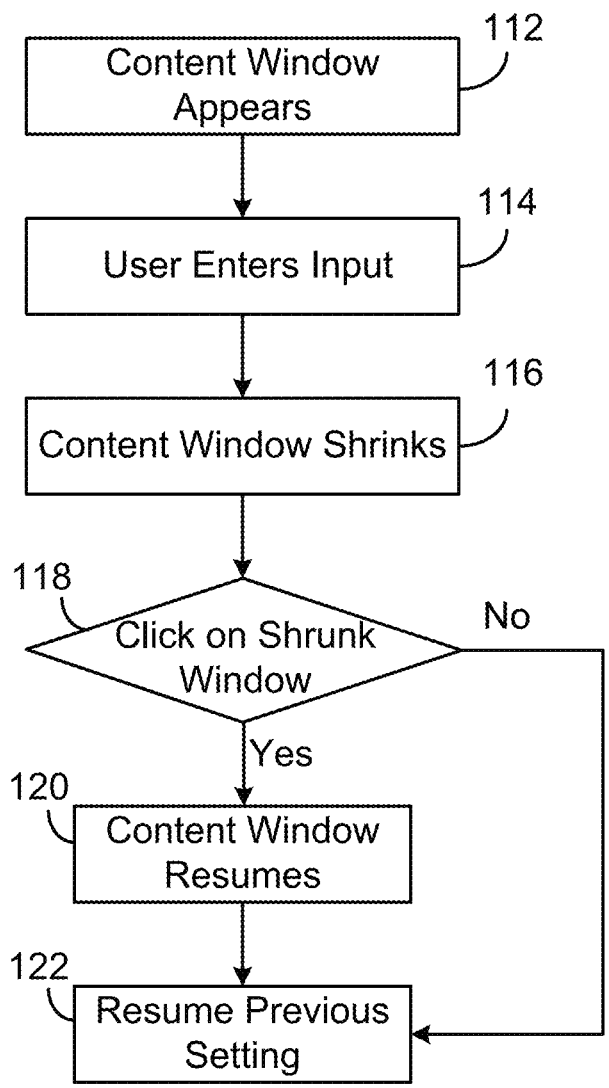
Figure 5:
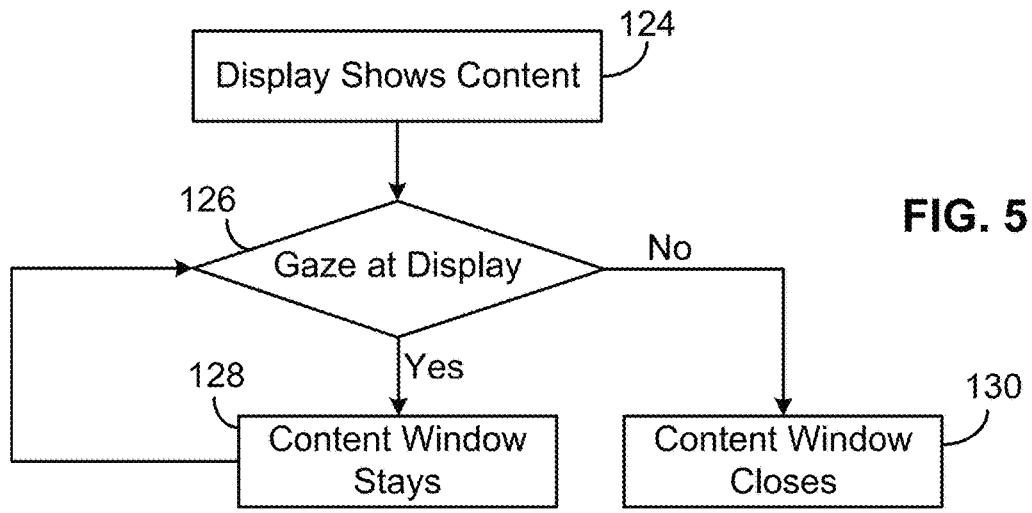

FIGS. 3, 4 and 5 are exemplary flow diagrams showing respective embodiments in accordance with the present invention.

Figure 6:
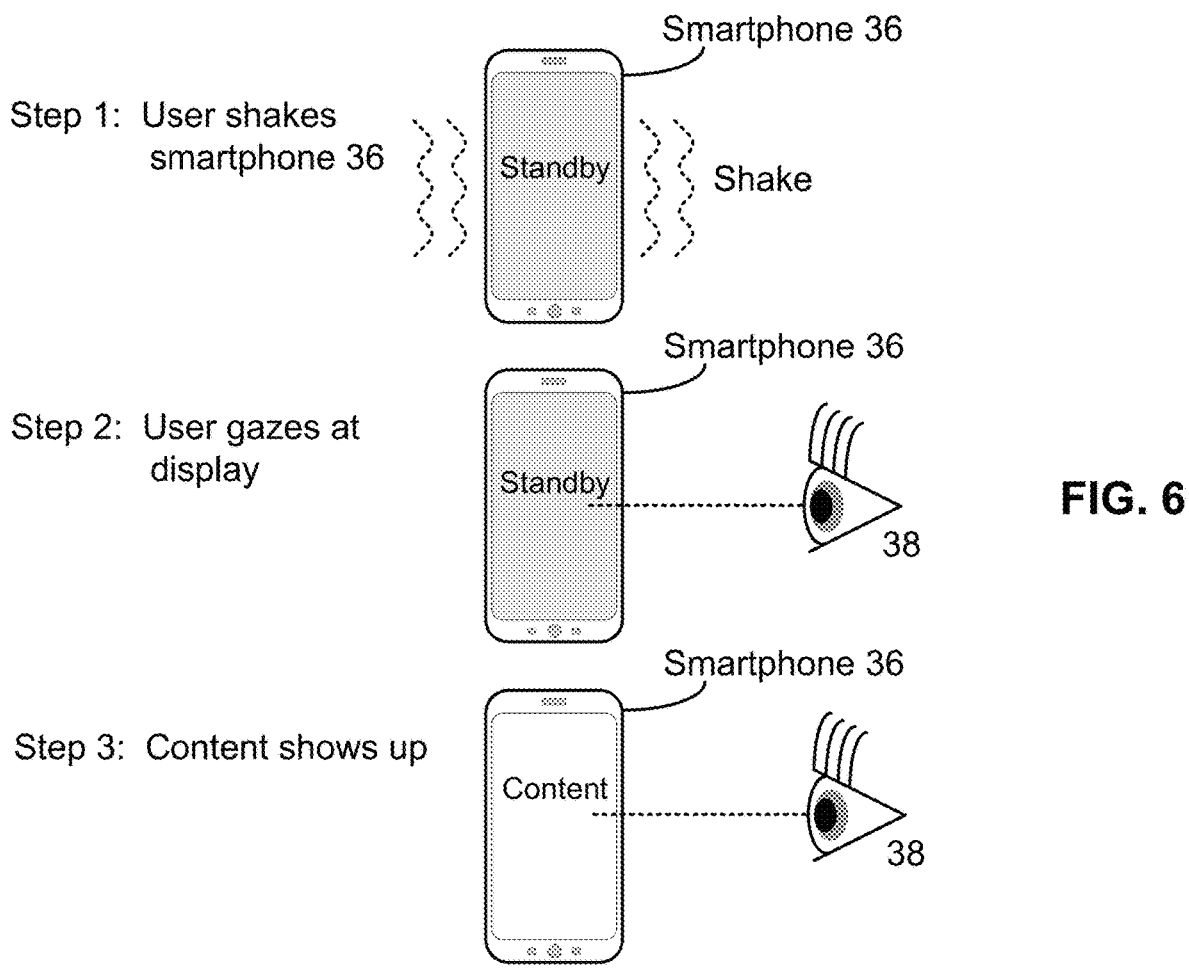

FIG. 6 displays exemplary diagrams showing another embodiment in accordance with the present invention.

Figure 7:
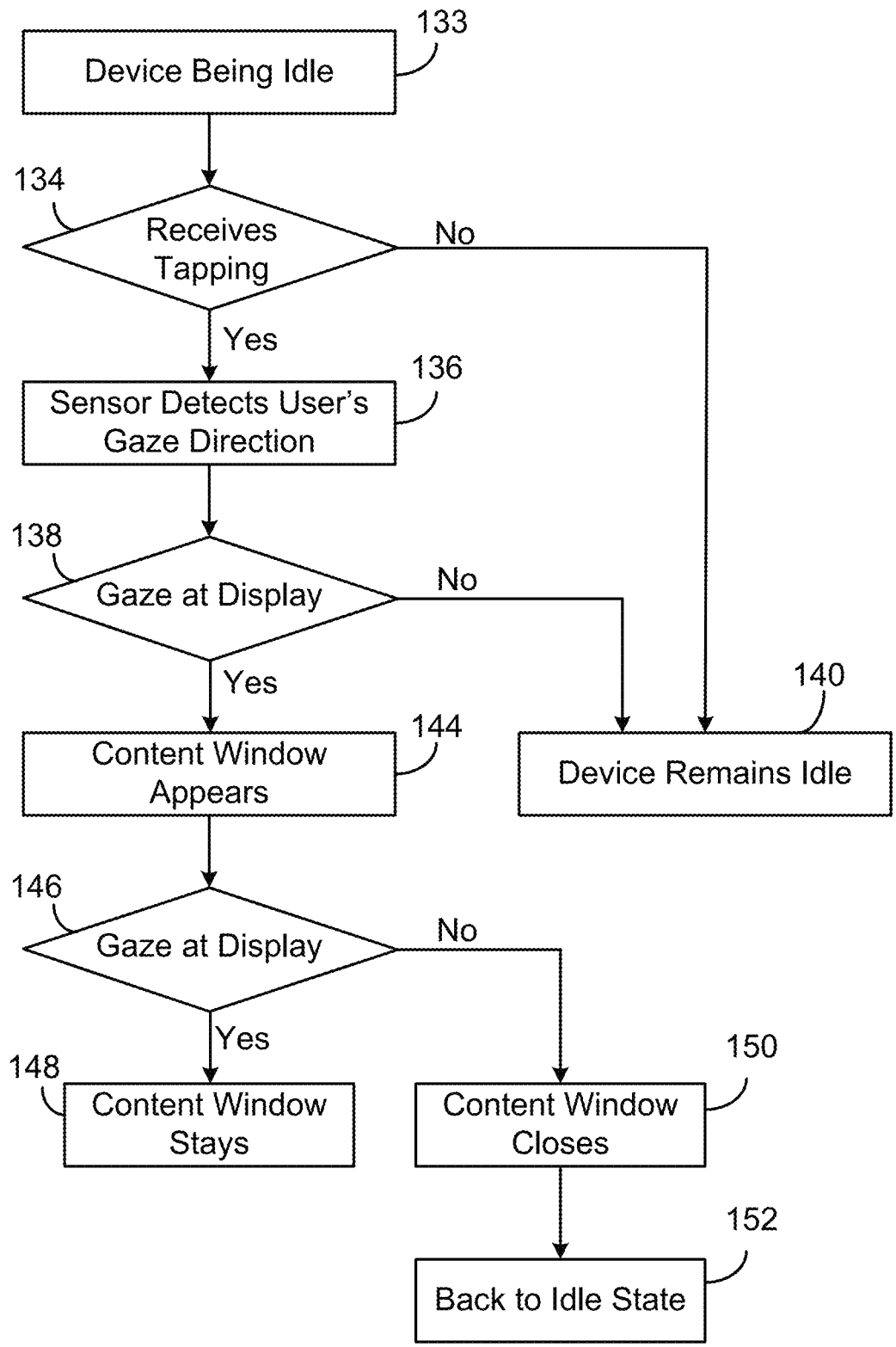

FIG. 7 is an exemplary flow diagram showing steps of the embodiment depicted in FIG. 6 in accordance with the present invention.

REFERENCE NUMERALS IN DRAWINGS

| 10 | Sensor | 12 | Database |
|---|---|---|---|
| 14 | Communication Network | 16 | Processor |
| 18 | Processing Module | 20 | Sensor |
| 22 | Computer Readable Medium | | |
| 24 | Sensor | 30 | Smartphone |

-continued

| 32 | Eye | 36 | Smartphone |
| 38 | Eye | 80 | Client System |
| 82 | Service Facility | | |// 
100, 102, 103, 104, 105, 106, 108, 110, 112, 114, 116, 118, 120, 122, 124, 126, 128, 130, 132, 133, 134, 136, 138, 140, 144, 146, 148, 150, 152 are exemplary steps.

DETAILED DESCRIPTION

FIG. 1 is an exemplary block diagram of one embodiment according to the present invention. A client system 80 and service facility 82 are connected via a communication network 14. Client 80 may represent an electronic device, including but not limited to a desktop computer, a handheld computer, a tablet computer, a wireless gadget (such as mobile phone, smart phone, smart watch, and the like), etc. Client 80 may include a processor 16 and computer readable medium 22. Processor 16 may mean one or more processor chips or systems. Medium 22 may include a memory hierarchy built by one or more memory chips or storage modules like RAM, ROM, FLASH, magnetic, optical and/or thermal storage devices. Processor 16 may run programs or sets of executable instructions stored in medium 22 for performing various functions and tasks, e.g., playing games, playing music or video, surfing on the Internet, email receiving and transmitting, displaying advertisements, etc. Client 80 may also include input, output, and communication components, which may be individual modules or integrated with processor 16. Usually, client 80 may have a display with a graphical user interface (GUI). The display surface may also be sensitive to touches, especially in the case of tablet computer or wireless gadget. Client 80 may also have a voice recognition component to receive audio input from a user.

Service facility 82 may include a processing module 18 and database 12. Module 18 may contain one or more servers and storage devices to receive, send, store and process related data or information.

The word "server" means a system or systems which may have similar functions and capacities as one or more servers. Main components of a server may include one or more processors, which control and process data and information by executing software, logic, code, or carrying out any other suitable functions. A server, as a computing device, may include any hardware, firmware, software, or a combination. In the most compact form, a server may be built on a single processor chip. In the figure, module 18 may contain one or more server entities that collect, process, maintain, and/or manage information and documents, perform computing and communication functions, interact with users, deliver information required by users, etc. Database 12 may be used to store the main information and data related to users and the facility. The database may include aforementioned memory chips and/or storage modules.

A communication network 14 may cover a range of entities such as the Internet or the World Wide Web, a local area network (LAN), a wide area network (WAN), a metropolitan area network (MAN), a telephone network, an intranet, wireless, and other types of networks. Client 80 and facility 82 may be connected to network 14 by various wired, wireless, optical, or other connections.

Client 80 may include a sensor 10 which tracks the eye of a user using mature eye-tracking technologies. The sensor may be arranged very close to the screen of a display and designed to obtain a picture of the facial part of a user. The system may recognize whether a user's gaze is in such a direction that the eye sight may fall on the display screen of client 80. In other words, sensor 10 may be employed to determine whether a user is looking at the screen of a device through proper algorithms. Sensor 10 may be built using imaging technologies, and the image of a user's eye may be analyzed to decide which direction the user is looking at. Both visible and infrared light may be employed for eye-tracking. In the latter case, an infrared light source may be arranged to provide a probing beam.

Client 80 may also include a sensor 20 which functions as a motion detector, which is well known in the art and employed at some devices already. Sensor 20 may be used to detect movement of an object outside the device. It may include a camera-like system to obtain images and then recognize any movement through image analysis over a period of time. As sensor 10 has imaging capabilities, sensor 10 may be arranged to work both as an eye-tracking device and as a motion detector, which is desirable when small size is required.

Furthermore, client 80 may contain a sensor 24 to detect its own movement by sensing acceleration, deceleration, and rotation. Sensor 24 may employ one or multiple accelerometers, gyroscopes, and/or pressure sensors for performing various measurement tasks which may include detecting device shaking, device vibration, user running, user walking, and so on.

FIG. 2 shows exemplarily one embodiment according to the present invention. The essence is to utilize sleeping devices to bring info to idle users. In Step 1 of the figure, a smartphone 30 is standby or idling, with a dark screen showing nothing. In Step 2, a user gazes at the screen, reflected by an eye 32 looking at it. If the gazing time elapses beyond a certain value, it may be interpreted as the user might have spare time and might be willing to view info presented on the screen. Then in Step 3, the screen lights up and content items are presented. The user may continue to look at the screen and view the content items, or turn his or her sight away from the screen. If the user redirects gaze direction to elsewhere for a certain period of time, it may be deemed as not wanting to watch the content any more. Then the screen may turn dark and the smartphone may become idle or standby again, as depicted in Step 4.

Content items presented on an idling device may include any category of information such as breaking news, regular news, market updates, newly-arrived shared photos, email alert, text messages, video clips, advertisements, community events, sports, and so on. A user may choose what information may be presented. A user may also rely on a program and/or a service provider, which is connected to a device via communication networks, to arrange content items to be presented.

FIG. 3 is a schematic flow diagram illustrating one embodiment of providing information according to the present invention. The process starts with Step 100, occurrence of an idle device, meaning no user is actively doing anything with it and the idle mode has been there for a while. A device being idle or standby may mean the device has been in that state for some time, beyond a given period. Examples of idling device may include a desktop computer or tablet computer running by itself for a certain period of time without any input from users, a computer or tablet computer running on screen-saver mode, a cell phone or smartphone in standby state, i.e., ready to receive incoming calls while in a lower-power energy-saving state, or in general, a running electronic device with a lower or much lower power consumption setting and probably a blank screen if it has one, etc. Next, in Step 102, the device detects a user's gaze and analyzes whether the user looks at its display, by sensor 10 in FIG. 1 for example. In Step 103, if the user doesn't gaze at the display, the device may enter Step 105, remaining in idle or standby status. If the device detects that the user has been looking at the display for a certain period of time and its idle time is beyond a given value simultaneously, the device may be programmed to grasp the opportunity and present a content window in Step 104. The new window may show information which a user may prearrange or show content items received over the network or from the Internet, like news update, event update, real-time broadcast, etc. As the user isn't running anything at the device, it doesn't interfere with the user's activity; and since the user is looking at the screen, content presented may have a good chance to catch his or her attention. Next in Step 106, if the user moves sight away from the screen, indicating the user may be unwilling to watch it any longer, the content window may close in Step 110, and the display may return to the previous blank setting. Then the device may go back to idle state in Step 132. If the user keeps watching the content or keeps an eye on the screen, the device may stay engaged in Step 108, and the content window may remain on the screen. The content items may cover a wide range of subjects and may switch topics according to prearranged schedules.

Aside from turning idle time into informative or entertaining sessions, an idle user may also mean an opportunity for presenting certain special kinds of information. Take advertisements for instance. If an advertisement is introduced in the middle of a program which a user is running, it may offend the user due to the intrusive and disruptive nature. But if an ad is brought in at the end of a program, a user may prepare to leave or start another task, and thus may not have enough time or interest watching the ad, causing ineffectiveness of advertising effort. On the other hand, when a user is idle and is gazing at a blank screen, appearance of ads on the screen may be less intrusive and probably more acceptable and more effective. After all, the user has nothing to do and the ads may get enough attention. Moreover, the ad may have a chance to take a full screen, particularly valuable for devices having a small screen size such as smartphones. Ads presented on smartphones always have size issues due to limited screen dimension and lower priority status relative to what a user is doing or watching.

FIG. 4 is a schematic flow diagram illustrating another embodiment of presenting content items according to the present invention. In Step 112, a content window appears on a display. Occurrence of the window may be triggered by a user's gaze, like what described in the above regarding the process in FIG. 3. Content items may be chosen by service providers or pre-selected by a user, or combination of both. If a user likes the content and keeps watching it, content window may stay for a while. But if the content items are not appreciated or a user wants to run another program, he or she may want to close the window right away. Thus in Step 114, the user may take an action like pushing a button, tapping an icon on a touch-sensitive screen, or clicking on an object using a mouse. Then in Step 116, the content window shrinks to a much smaller size, or becomes an icon on the display. The window is not completely gone because a user may want to revisit it at a later time. In Step 118, if a user clicks on the shrunk window or icon, the content window may resume, and the content items may come back in Step 120. The user may start watching the previous content items, or play with the window to find more things of interest. If a user ignores the shrunk window in Step 118, the window may remain there for a given period of time and then go away, causing no nuisance to a user. In the meantime, the screen may return to the previous setting in Step 122. In the former case, after a user goes back to the content items in Step 120 and spends enough time, the user may close the window and reaches Step 122, resuming a previously paused session.

Returning to Step 104 of FIG. 3. When a user opens up a content window by gaze, he or she may watch it continuously, or close it with ease. FIG. 5 shows a schematic flow diagram to illustrate the situation in detail. In Step 124, a window is created on a display and content items are shown to a user. Meanwhile, the gaze direction of the user is monitored continuously. In Step 126, if it is detected that the user looks away from the display for a given period of time, Step 130 is implemented. The content window closes and the device may return to its idle or standby state. If the user keeps watching the display, it goes from Step 126 to Step 128, and the window remains open and content items are presented and refreshed per schedule in place. To provide convenience for a user, a cycle is designed, which consists of Step 126 to 128, then back to Step 126, and then to Step 128 or 130. As a result, a user may watch content items presented by the display on and on, and meanwhile the user may close the content window at any time by looking away from the display. Of course, a user may reopen the window any time by looking at the display or reopen the window by running certain application designed for such a purpose. Therefore, a user may choose to watch scheduled content or walk away from it easily and conveniently.

Referring back to FIG. 1, sensor 20 may be employed to work together with sensor 10. For instance, sensor 20 may detect movement of a user. When a user approaches a device, sensor 20 may detect it and then the system may activate sensor 10 to detect the user's gaze direction. In other words, physical movement of a user may be considered as a user input to control the device. In the meantime, the device may be designed to wake up from sleep state and return to standby state after sensor 20 detects a given signal. Since a motion detector may consume less power than an eye-tracking sensor, it saves energy and extends the battery life of a device.

Senor 24 may be used to save energy of a device too. For example, when sensor 24 detects that a device's position is unstable or changes in an unusual way, the device may be configured to turn off sensor 10. Thus under such a circumstance, its display may remain blank or in screen-saver mode even when it is gazed by a user.

In addition, sensor 24 may be used to design another embodiment. For instance, a user may want to take initiative to lighten up a dark display and make use of standby or idle device in a simple and convenient manner. Suppose a user is looking at a blank screen of a standby smartphone 36, maybe at a subway station. The user may want to watch something to kill time, but doesn't have any idea about what to watch. So the user may follow the exemplary steps illustrated in FIG. 6 to start a content show which would be presented on the idling device. Let us assume shaking is selected as an input signal and a detector like sensor 24 is arranged to detect whether a device is shaken by a user or not. In Step 1, the user may shake smartphone 36 a bit. The shaking act is caught by the detector, which may send a signal to trigger a sensing process to ascertain whether the user gazes at the phone. For instance, a circuitry may be configured such that shaking may activate a gaze sensing system. Then in Step 2, the user may look at the phone screen or an eye 38 may gaze at it as shown in the figure, which is detected and next in Step 3, content items may show up on the screen. The content items may be selected by a service provider, including topics like instant news, weather forecast, promotions nearby, ads, and so on. Thus with a little shaking and some gazing, a user may get content items presented to him or her on an idle device instantly. Compared to the gaze-only scenario as described in FIGS. 2 and 3, the embodiment in FIG. 6 gives another option to a user. It also avoids content shows caused by unintended gaze. Probably more important, the scheme saves energy as a gaze sensing system may be off most of the time unless getting activated upon receiving shaking signals.

Besides shaking, there are many other acts or other physical movements which may be employed as the first step to work with a dark screen and to view content items on it. For instance, tapping, scribbling or sliding on a touch-sensitive screen, or tapping on certain area of a device where sensitive sensors may be placed, may also be incorporated as the first indicator that a user may want to watch something on an idle device. It may depend on a specific app or program to specify what kind of physical move may be taken as an input for a device. If there is more than one option, a user may select a method which may seem more convenient and effective.

FIG. 7 shows an exemplary flow diagram to illustrate the embodiment depicted in FIG. 6 with more details. Assume that tapping is designated as the first signal needed. In Step 133, a device is in idle or standby mode except a tap sensor. The tap sensor, e.g., sensor 24 in FIG. 1, is powered on to detect tapping act performed by a user. A qualified tapping may be one tap or two consecutive taps with finger or hand. In Step 134, if no tapping is received, the device may stay in the original state, being idle or standby as in Step 140. If tapping is sensed, a gaze sensor may start working to detect whether a user gazes at the display in Step 136. Next in Step 138, if the user's sight is not on the display within a given period of time, the device may go to Step 140, returning to idle or standby state. If the user's sight or gaze turns to the display within a given period of time and the act lasts long enough, a content window may show up in Step 144. Then in Step 146, the gaze sensor may continue to monitor the user's gaze direction. If a user doesn't want to watch the content, his or her gaze may be directed to elsewhere away from the device. Then the content window may close in Step 150 and the device may go back to an idle or standby mode in Step 152. If the user keeps watching the content, his or her gaze stays with the device, and the content show may continue in Step 148.

Speech recognition and voice generation functions may be incorporated to make a process easy and smooth. For example, after a content window is staged by a user's gazing act, the window may be closed when a user simply says "No", if speech recognition technology is employed. Additionally, a content window may be arranged to show up quickly after a user says a predetermined word like "info" or "content" and then starts looking at the screen. A device may also generate a short speech to describe an info session after a content window is presented.

When voice recognition and gaze detection are used together, only one device, which is gazed at, may respond to a user's voice instructions. Thus a user may give a voice command to a device exclusively and conveniently by speaking to and looking at it. Without gaze detection, multiple devices may react to a voice command and it may cause a chaotic scene. Without voice recognition, a gazing act may invoke a single and often simple task only, which limits applications.

Two scenarios may exist, when voice recognition and gaze detection are used to enable interaction between a user and a device: A user may say certain word or words and then look at a device or say certain word or words and look at a device at the same time. The two actions, i.e., speaking and gazing, in both scenarios may be arranged to cause a device to carry out one or more tasks. As aforementioned, a gazing act means a user gazes at a device for at least a certain time period. The one or more tasks may be predetermined. For instance, it may be arranged that a user may say a given word or short sentence. The given word or sentence may mean a request for one or more tasks. Then, a device may carry out the one or more tasks. A user may also say one or more sentences to describe a task and ask a device to do it. A device may use voice recognition techniques to analyze and interpret a user's voice input and obtain one or more tasks from the input.

The one or more tasks include presenting certain content items on a screen or via a speaker, turning on a device from standby or power-off state, switching from one to another working mode, implementing one or more actions specified in a voice input, and performing other given tasks. For brevity purpose, only one or two tasks are cited when discussing voice-related examples below, where other tasks may be applied without mentioning. Content items presented using or at a device may be related to a location, scheduled by a user, arranged by a remote facility or service center, or specified in a voice input. The content items may have video, audio, or another format and may be subscribed with fees or sponsored by an entity. A device may present content items using a display, a speaker, or other output components. Initially, the device may be at a standby, sleeping, power-off, or power-on state. In some applications, whether or not a user gazes at a device may be detected. In other applications, whether or not a user gazes at a device's display, speaker, or another output component may be detected. For brevity reasons, only the former case, i.e., gazing at a device, is mentioned in discussions below.

When a device is ready, a voice recognition system may be powered on and monitor a user's voice input from the beginning. A gaze detection system may be turned on in response to receiving a user's voice input. A gaze detection system may also be powered on all the time.

In both scenarios, a user's verbal instructions are carried out when a device detects that the user gazes at it. Hence a user's command may not be carried out, if the user is out of sight, i.e., the user's gazing direction can't be ascertained. For instance, when a user shouts a few words as a command from another room and a device can't find the user in sight, the device may not follow the command to do a task even though the device may get the command from a voice recognition system. Similarly, a device may not implement a task if the task is obtained from a voice output generated by another device, such as a television, a speaker, or a smartphone, since a corresponding gaze doesn't exist and thus can't be detected.

When a name is assigned to a device by default or a user, such as "DJ", the device may be arranged to perform a task after it receives a voice command which contains the name and the task. Examples of corresponding voice commands include "DJ, turn on the lights". The exemplary command comprises a predetermined name and a task and a device may do the task after receiving the command. Mature voice recognition techniques may be used to interpret a voice command. Sometimes, one or two sentences containing a name and a task may come from a television, when it presents a movie or advertisements. Such a case may be rare, but it does have a chance to happen and may become an issue. Thus, there exists a need to avoid taking a voice command from a machine. It may be arranged that a device ascertains whether a voice input comes from a user, after it gets the input which contains a predetermined name and a task. If the device detects that the input is from a user, it performs the task; otherwise, the device declines to do the task and the input may be discarded.

Locating techniques are needed to detect whether a voice comes from a user. For instance, a device may have a locating detector to measure the source of a voice and then ascertain whether a target at the source is a user or a machine. The ascertaining step, or identifying step, may be performed using mature identity recognition technologies. A locating detector may measure and analyze sound waves and then calculate a source position via algorithms using mature methods. An identity recognition system may use a camera to take pictures of a target at the source position. Whether the target is a user or not may be determined by analyzing the pictures via algorithms and mature techniques. A device may be arranged to follow instructions only after it is detected that the instructions are from a user. When a device receives a voice command from a user who is out of sight, like in another room, the device may be configured to ignore or discard the command as it can't determine the command is from a user, even though the command contains a name of the device and does come from a user.

In some cases, however, we may want a device to control another device via a voice command. In some other cases, we may want to tell a device to do a task when we are not in sight. For instance, a user may set up a wake-up alarm at a smartphone. When the alarm sounds in the morning, it also produces a voice output, like "DJ, turn on the lights", where DJ is the name of a device. Then the device may switch on light bulbs in a room. Sometimes, we may want to shout to issue a command without seeing a device, which means the device can't see us either. In such cases, we want a device to follow a voice command without ascertaining whether the command comes from a user. Thus, there exists a need for a device to follow a voice command unconditionally, or a need of a specific type of command which a device follows without checking any factors related to a user.

A specific type of command may contain three items: A name, a code, and a task. The name is an assigned name as aforementioned. The code functions as a label. When a device receives a voice command containing a predetermined name, it may ascertain whether the voice is from a user via locating and identification means. When the device detects that the voice comes from another device, somewhere out of sight, or multiple sources (such as multiple speakers), it may be arranged to decline to follow the command. In other words, the device may be arranged to implement the command only when it is detected that the voice comes from a user.

When the device receives a voice command which contains a predetermined name, a code, and a task, it may follow the command without ascertaining anything related to a user, like whether the command is from a user or not. A code may be selected and decided by a user. It may be a simple one which is easy to use and remember. A code may include a numerical number, a word, a phrase, a short sentence, or a mixture of numbers and letters. Examples of codes include 123, 225, bingo, listen, "it's me", and so on. Assume that an assigned name is "DJ" and a code is "it's me". Examples of voice commands include "DJ, it's me, turn on air conditioning." When a device receives the command, it gets the name, code and task via a voice recognition system. Since the command has the name and code, there is no need to detect where it comes from or verify any things. The device may turn on an air conditioning system promptly.

To accommodate various cases and different needs of users, the following method may be arranged. Assume that a device has a voice recognition system for sensing, receiving, and interpreting a voice input. The system is powered on at the beginning. The device also has a gaze detection mechanism or sensor for detecting a user's gaze direction, a locating mechanism or sensor for detecting a source position of a voice input, and an identification mechanism or system to detect whether a target is a user or a machine. The above mechanisms may be in operational mode from the beginning or triggered individually by a signal after a voice input is received.

Assume a name and a code are assigned to the device. The device receives a voice input at the beginning. Content of the input may be obtained through the voice recognition system. There are three situations and five options. In situation 1, it is detected that the voice input contains the name, the code, and a task. There is one option, option 1, provided for a user. If option 1 is selected or enabled, the device performs the task right away after receiving the input, since it contains the name and the code. For instance, a user may say a name first, followed by a code, and one or more sentences to describe a task at last. Aforementioned example "DJ, it's me, turn on the lights" has such a sequence along a timeline. Once a device receives the input, the task is performed without the needs of checking anything else. Alternatively, a user may say the name first, then a task, and finally the code. For instance, a user may also say "DJ, turn on the lights, it's me". The code "it's me" is placed behind the task in the sequence. In yet another configuration, a code may come first, like "It's me, DJ, turn on the lights." When a device receives a voice input, it may search and recognize three items: a predetermined name, a code, and a task, regardless of a sequence of the items in the input. As long as a device gets the three items, it is configured to carry out the task when the name and code match a given profile respectively.

In situation 2, the voice input contains the name and a task. There are three options provided for a user. In option 2.1, the device is configured to do the task when the input contains the predetermined name and the task. In option 2.2, the device is configured to do the task when the input contains the predetermined name and the task and the input comes from a user. When the device receives the voice input, it measures where the voice comes from and then ascertains whether a target at a source of the voice is a user. If the target is not a user, the task is not performed. In option 2.3, the device is configured to do the task when the input contains the predetermined name and the task and it is detected that a user gazes at or looks at the device. When the device receives the voice input, it detects the gaze direction of a user. If the user doesn't gaze or look at the device, the task is not carried out. In addition, the sequence of a name and a task along a timeline doesn't matter, as long as the name is correct. For instance, a user may say "DJ, turn off lights" or "Turnoff lights, DJ". A device may follow both orders and turn off lights.

In situation 3, the voice input contains a task only and doesn't include the name and the code. There is one option, option 3, arranged for a user. When option 3 is chosen, the device performs the task after receiving the input, sensing a user, and determining that the user gazes or looks at the device. The device declines to do the task if it is detected that the user doesn't gaze or look at the device. In situations 2 and 3, when it is detected that a user "gazes or looks at the device", it means the user gazes or looks at the device when the user is submitting the voice input or within a given time period after the user submits the voice input.

A user may select one, two, or three options each time. For instance, a "Setup" button may be configured on a touch screen of a device. A user may tap the button to open a setup window, where the user may tap check boxes to make selections. A user may choose a single one among the five options to cover one situation only. If a user selects option 1, the device performs a task only after it obtains the name, the code, and the task from an input. If a user selects option 3, the device executes a task only when the user says the task and gazes or looks at the device.

A user may also select two options to cover two situations. Since options 1 and 2.1, 2.1 and 2.2, 2.1 and 2.3, 2.2 and 2.3, 2.3 and 3 overlap each other respectively, there are five possible cases. The five cases include options 1 and 2.2, 2.3, or 3, options 3 and 2.1 or 2.2. If options 1 and 3 are selected, for instance, a task is performed when a voice input contains the name, the code, and the task or a voice input contains the task and it is detected that a user gazes or looks at the device.

In addition, a user may select three options to cover all three situations. The three selections contain options 1, 2.2, and 3. A task is performed when a voice input contains the name, the code, and the task, a voice input contains the name and the task and it is detected that the input comes from a user, or a voice input contains the task and it is detected that a user gazes or looks at the device.

CONCLUSION, RAMIFICATIONS, AND SCOPE

Thus it can be seen that systems and methods are introduced for presenting information or performing a task using an electronic device.

The improved methods and systems have the following features and advantages:
(1). An idle or standby device is used to present content items to a user;
(2). Gazing direction is used to determine when to present content items and when to stop it; and
(3). User input such as shaking, tapping or speaking to a device is combined with gaze detection to determine when to present content items or perform a task.

Although the description above contains many specificities, these should not be construed as limiting the scope of the invention but as merely providing illustrations of some of the presently preferred embodiments. Numerous modifications will be obvious to those skilled in the art.
Ramifications:

A presentation method based on eye-tracking or gaze-sensing technologies may be applied to cell phone, smart phone, smart watch, tablet computer, laptop computer, desktop computer, television, game player, digital billboard, or any other electronic devices or systems having a display and certain computing power.

Ambient light sensor may be added to a device to sense ambient light intensity, which may be used to determine whether the device is in a pocket or bag. If a device is not pulled out, measurement results of a motion sensor may be ignored in applications discussed.

A content window may be configured to close by itself when certain motion is detected by accelerometer or gyroscope sensors, even though a user is still watching the screen, as it is uncomfortable to view any content, or inappropriate to show any content in such conditions.

Moreover, a device may be equipped with a facial recognition system to create an extra layer of protection. The system may at least recognize a device owner, which may protect a user's privacy by not following other people's instructions, or may be used to present different information to different users according to prescheduled plans. For instance, the system may be used to identify a user against given facial criteria. If an identification process fails to provide a positive result, any input received from the user may be discarded. No matter what the user does, an operational state or inactive state of a device is not affected by the user's action. It also means that a user has to be in sight so that a device may ascertain the user and perform an identity verification process. The system may make use of a camera which is employed by gaze detection to get dada and employ facial recognition algorithms to identify a user.

To trigger a content window by a gazing act, a user may also look at things located outside a display but close to its edge, instead of looking at the display directly. The reason is that, when a user looks at objects close to a display, content shown on the display may also reach the eye, thus providing a viewing opportunity anyway. And hopefully, the user may turn his or her sight a bit to get a better reception of the content. Moreover in many cases, instead of display, it may be enough to trigger a content show if a user just looks at an idling device for a given period of time, because it may mean both parties are available and the user may have a good chance to notice content items displayed on the device. In cases of smartphone and tablet computer, gazing at a device is almost equivalent to gazing at a display, because for these devices, a display may covers the whole area of one side.

Lastly, a method may be configured which ascertains whether a user faces a device, instead of gazing at a device. In some applications, it may be difficult to sense a user's eye movement, due to technical issues or ambient lighting conditions. Thus it may be arranged to detect whether a user faces a device. For instance, a device may use an imaging sensor like camera to take pictures or videos of a user. Certain algorithms may be used to identify facial features of the user, determine positions of the user's eyes, and then calculate a distance between a spot of the device and one eye and another distance between the spot and the other eye. The spot may be a point at the center of the device or the center of an output component. If difference of the two distances is smaller than a given value, it may be considered that the device is right in front of the user or the user faces the device. Consequently, it may be configured that in all of above discussions, a gazing requirement may be replaced by a facing requirement when a user or entity decides to do so. For instance, a requirement of gazing at a device may become a requirement of facing a device.

Therefore the scope of the invention should be determined by the appended claims and their legal equivalents, rather than by the examples given.

The invention claimed is:
1. A method for presenting information at an electronic device, comprising:
1) detecting an act made by a user involving physical contact with the electronic device or physical movement of the electronic device when a display of the electronic device has an idle screen or a screen in standby mode, inactive mode, or screen-saver mode;
2) performing gaze detection only after detecting the act;
3) ascertaining whether the user looks at a direction toward the electronic device;
4) determining whether the user is recognized via a recognition mechanism; and

5) presenting a plurality of content items when the user is recognized via the recognition mechanism and it is ascertained that the user looks at a direction toward the electronic device.

2. The method according to claim 1 wherein the plurality of content items is unrelated to content presented before a state of the idle-screen, the inactive mode, or the screen-saver mode.

3. The method according to claim 1, further including stopping presenting the plurality of content items when it is detected that the user looks at a direction other than the one toward the electronic device.

4. The method according to claim 1 wherein the recognition mechanism includes a facial recognition method.

5. The method according to claim 1 wherein the plurality of content items includes at least one of the following items: news, alert, update, email, text message, sponsored content, and other information.

6. The method according to claim 1 wherein the plurality of content items is arranged by a service.

7. The method according to claim 1, further including presenting different information when a different user is recognized.

8. A method for presenting information at an electronic device, comprising:
   1) monitoring the electronic device or physical movement of the electronic device to sense an act made by a user when a display of the electronic device has an idle screen or a screen in standby mode, inactive mode, or screen-saver mode;
   2) performing gaze detection only after sensing the act;
   3) determining whether the user is recognized via a recognition mechanism;
   4) detecting whether the user looks at a direction toward the electronic device; and
   5) presenting a plurality of content items when the user is recognized via the recognition mechanism and it is detected that the user looks at a direction toward the electronic device.

9. The method according to claim 8 wherein the plurality of content items is unrelated to content presented before a state of the idle screen, the inactive mode, or the screen-saver mode.

10. The method according to claim 8 wherein the plurality of content items is arranged by a service.

11. The method according to claim 8 wherein the plurality of content items includes at least one of the following items: news, alert, update, email, text message, sponsored content, and other information.

12. The method according to claim 8 wherein the recognition mechanism includes a facial recognition method.

13. The method according to claim 8, further including presenting different information when a different user is recognized.

14. An electronic device comprising: a processor, a recognition mechanism, and a memory or memory unit coupled to the processor, the processor operable when executing certain instructions to:
   1) detect an act made by a user involving physical contact with the electronic device or physical movement of the electronic device when a display of the electronic device has an idle screen or a screen in standby mode, inactive mode, or screen-saver mode;
   2) perform gaze detection only after detecting the act;
   3) determine whether the user looks at a direction toward the electronic device;
   4) determine whether the user is recognized via the recognition mechanism; and
   5) present a plurality of content items when it is determined that the user looks at a direction toward the electronic device and the user is recognized via the recognition mechanism.

15. The electronic device according to claim 14 wherein the plurality of content items is unrelated to information presented before a state of the idle screen, the inactive mode, or the screen-saver mode.

16. The electronic device according to claim 14 wherein presentation of the plurality of content items is stopped when it is detected that the user looks at a direction other than the one toward the electronic device.

17. The electronic device according to claim 14 wherein different content is presented when a different user is recognized.

18. The electronic device according to claim 14 wherein the plurality of content items includes at least one of the following items: news, alert, update, email, text message, sponsored content, and other information.

19. The electronic device according to claim 14 wherein the user relies on a service to arrange the plurality of content items.

20. The electronic device according to claim 14 wherein the recognition mechanism includes a facial recognition method.

* * * * *

(12) INTER PARTES REVIEW CERTIFICATE (4242nd)
United States Patent (10) Number: US 11,016,564 K1
Li (45) Certificate Issued: Jan. 26, 2026

(54) SYSTEM AND METHOD FOR PROVIDING INFORMATION

(71) Applicant: Chian Chiu Li

(72) Inventor: Chian Chiu Li

Trial Number:

IPR2023-00560 filed Feb. 7, 2023

Inter Partes Review Certificate for:

Patent No.: 11,016,564
Issued: May 25, 2021
Appl. No.: 16/779,676
Filed: Feb. 3, 2020

The results of IPR2023-00560 are reflected in this inter partes review certificate under 35 U.S.C. 318(b).

INTER PARTES REVIEW CERTIFICATE
U.S. Patent 11,016,564 K1
Trial No. IPR2023-00560
Certificate Issued Jan. 26, 2026

AS A RESULT OF THE INTER PARTES REVIEW PROCEEDING, IT HAS BEEN DETERMINED THAT:

Claims 1-6, 8-12, 14-16 and 18-20 are cancelled.

\* \* \* \* \*